(12) United States Patent
Lovell

(10) Patent No.: US 9,395,009 B2
(45) Date of Patent: Jul. 19, 2016

(54) FLUID FLOW DEVICE THAT PROVIDES A SEAL BY EXPLOITING DIFFERENTIAL THERMAL EXPANSION

(71) Applicant: FISHER CONTROLS INTERNATIONAL LLC, Marshalltown, IA (US)

(72) Inventor: Michel K. Lovell, Marshalltown, IA (US)

(73) Assignee: FISHER CONTROLS INTERNATIONAL LLC, Marshalltown, IA (US)

( * ) Notice: Subject to any disclaimer, the term of this patent is extended or adjusted under 35 U.S.C. 154(b) by 176 days.

(21) Appl. No.: 14/057,621

(22) Filed: Oct. 18, 2013

(65) Prior Publication Data

US 2015/0108378 A1    Apr. 23, 2015

(51) Int. Cl.
  *F16J 15/02*    (2006.01)
  *F16K 25/00*    (2006.01)
  *F16K 3/24*    (2006.01)
  *F16K 3/26*    (2006.01)
  (Continued)

(52) U.S. Cl.
  CPC ............. *F16K 25/005* (2013.01); *F16J 15/028* (2013.01); *F16K 3/243* (2013.01); *F16K 3/246* (2013.01); *F16K 3/265* (2013.01); *F16K 27/041* (2013.01); *F16K 39/04* (2013.01); *F16K 3/32* (2013.01); *F16K 47/02* (2013.01)

(58) Field of Classification Search
  CPC .......... F16K 3/32; F16K 3/243; F16K 3/246; F16K 3/265; F16K 1/52; F16K 15/028; F16K 25/005; F16K 27/041; F16K 39/04; F16K 47/02; F16K 47/04; F16K 47/08; F16J 15/028

USPC ............. 137/601.18, 625.28, 625.3, 625.33, 137/625.37, 625.38, 625.39, 516.29; 138/40, 43; 251/118, 324, 332, 368
  See application file for complete search history.

(56) References Cited

U.S. PATENT DOCUMENTS 2,076,747 A * 4/1937 Salisbury ...................... 277/377
4,592,558 A * 6/1986 Hopkins ........................ 277/572
(Continued)

OTHER PUBLICATIONS

International Search Report and Written Opinion from International Application No. PCT/US2014/060910 dated Jan. 19, 2015.
(Continued)

*Primary Examiner* — Mary McManmon
*Assistant Examiner* — Richard K Durden
(74) *Attorney, Agent, or Firm* — Marshall, Gerstein & Borun LLP

(57) ABSTRACT

A fluid flow control device includes a valve body, a valve seat disposed within the valve body, and a valve cage coupled to the valve seat within the valve body. The fluid flow control device also includes a gland defined by the valve body, the valve seat, and the valve cage. The valve body has a first thermal expansion coefficient and the valve seat and/or the valve cage have a second thermal expansion coefficient different from the first thermal expansion coefficient. The fluid flow control device further includes a sealing assembly disposed within the fluid flow control device to provide a seal between the valve body and the valve cage. The sealing assembly exploits differential thermal expansion between the valve body and the valve cage in a direction parallel to the longitudinal axis and in a direction transverse to the longitudinal axis to improve the seal.

27 Claims, 8 Drawing Sheets

(51) Int. Cl.
*F16K 27/04* (2006.01)
*F16K 39/04* (2006.01)
F16K 3/32 (2006.01)
F16K 47/02 (2006.01)

(56) References Cited

U.S. PATENT DOCUMENTS 4,658,847 A * 4/1987 McCrone ............ 137/72
5,467,966 A * 11/1995 Nicholson ............ F16K 3/0227
 251/174
7,373,951 B2 * 5/2008 Gossett et al. ........... 137/625.33

7,448,409 B2 11/2008 Micheel et al.
7,926,784 B2 4/2011 Fleming
2006/0048826 A1 3/2006 Gossett et al.
2009/0127488 A1 5/2009 McCarty et al.
2009/0179169 A1 7/2009 Fleming
2009/0320931 A1 12/2009 Wears
2013/0082447 A1 4/2013 Evans et al.
2013/0248751 A1 9/2013 Anderson

OTHER PUBLICATIONS

International Preliminary Report on Patentability from International Application No. PCT/US2014/060910, dated Apr. 19, 2016.

* cited by examiner

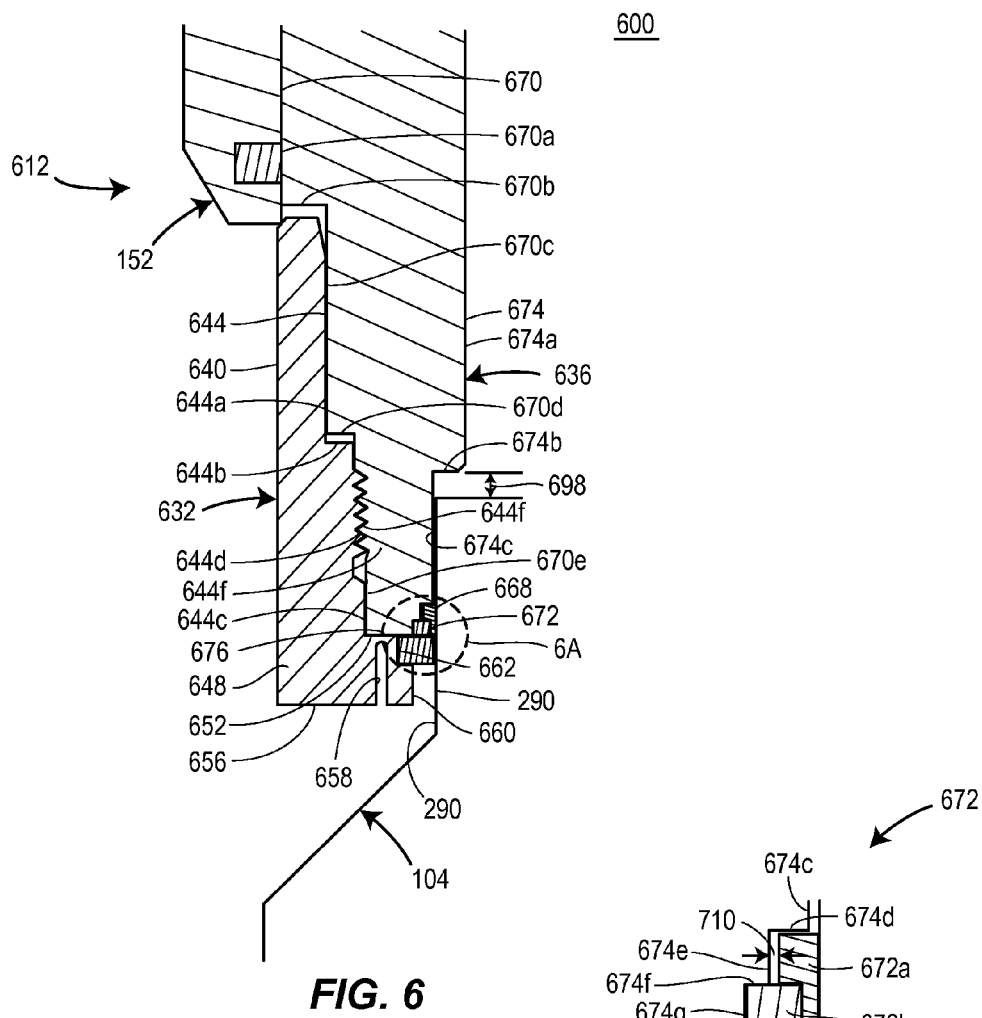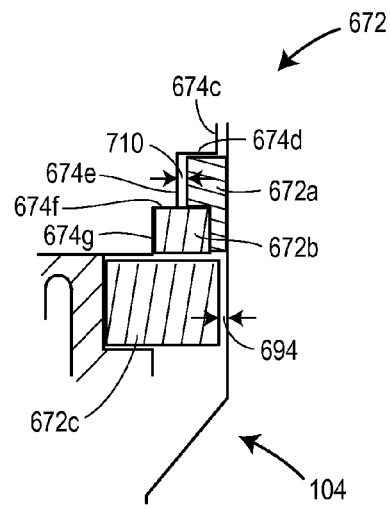
FIG. 6
FIG. 6A

FLUID FLOW DEVICE THAT PROVIDES A SEAL BY EXPLOITING DIFFERENTIAL THERMAL EXPANSION

FIELD OF THE DISCLOSURE

The present disclosure generally relates to fluid flow control devices and, more particularly, to a fluid flow device that provides an improved seal in the fluid flow device by exploiting differential thermal expansion between components in the fluid flow device.

BACKGROUND

Process control systems typically include various components for controlling various process parameters. For example, a fluid process control system may include a plurality of control valves for controlling flow rate, temperature, and/or pressure of a fluid flowing through the system. The end product is dependent on the accuracy of the control of these parameters, which is, in turn, dependent on the geometry and characteristics of the control valves. Control valves are, for example, specifically designed and selected to provide for particular flow capacities and pressure changes. When these characteristics are compromised, the quality of the end product may be affected.

Designing large control valves that are used at elevated temperatures is very difficult. As is known, a control valve can be provided with one or more seals to prevent leakage. A polymer seal can, for example, be provided between the valve seat ring and the valve body. Such polymer seals can be ineffective when used at high temperatures such as temperatures in excess of 450 degrees Fahrenheit. Moreover, when components of a large control valve (e.g., a control valve having a port size or ring diameter of at least six inches) are made from different materials, the components, by virtue of being made from different materials, have different thermal expansion coefficients, thereby producing differential thermal expansion between the components. In some cases, such as when the large control valve is used at elevated temperatures (e.g., temperatures in excess of 1000 degrees Fahrenheit), this differential thermal expansion can be quite significant. In smaller control valves (e.g., control valves having a port size of less than six inches), a single gasket can be used to compensate for any differential thermal expansion between components. The single gasket typically used in smaller control valves cannot, however, withstand the differential thermal expansion often seen in large control valves. One option is to significantly limit the number of material combinations for large control valve components. Then, however, large control valves must generally be made from components of the same material. Alternatively, costly architecture features, such as seat rings welded or bolted into the valve body, must be employed.

SUMMARY

One aspect of the present disclosure includes a fluid flow control device. The fluid flow control device includes a valve body, a valve seat, a valve cage, and a valve plug. The valve body defines an inlet, an outlet, a fluid flow path extending between the inlet and the outlet, and a longitudinal axis. The valve body has a first thermal expansion coefficient. The valve seat is disposed within the valve body and defines an orifice through which the fluid flow path passes. The valve cage is coupled to the valve seat within the valve body and defines an interior bore. The valve cage has a second thermal expansion coefficient different from the first thermal expansion coefficient. The valve plug is sized for insertion into the interior bore of the valve cage and is movable along an axis between a closed position, in which the valve plug engages the valve seat, and an open position. The fluid flow control device further includes a gland and a sealing assembly. The gland is defined by at least one of the valve seat and the valve cage. The sealing assembly is arranged within the gland to provide a seal between the valve body and the valve cage. The sealing assembly is arranged in a first compression state in which the sealing assembly provides first radial and axial compression forces. The sealing assembly is movable to a second compression state in which the sealing assembly provides second radial and axial compression forces greater than the first radial and axial compression forces. The movement of the sealing assembly is due to differential thermal expansion between the valve body and the valve cage in a direction parallel to the longitudinal axis and in a direction transverse to the longitudinal axis.

BRIEF DESCRIPTION OF THE DRAWINGS

FIG. 6 is an enlarged, partial cross-sectional view of a right-side portion of the control valve of FIG. 1 with a sealing assembly constructed and assembled in accordance with the teachings of a fourth disclosed example of the present invention.

FIG. 6A is an enlarged cross-sectional view of the sealing assembly of FIG. 6.

DETAILED DESCRIPTION

The present disclosure is directed to a large control valve that includes a valve body, a valve trim assembly, and a sealing assembly configured to seal the control valve at high temperatures (e.g., temperatures in excess of 450 degrees Fahrenheit). The high-temperature sealing assembly is disposed in the large control valve to provide an improved seal by exploiting differential thermal expansion between the valve body and the valve trim assembly, which can be made of different materials, in both a vertical or axial direction and a horizontal or radial direction.

Figures 1, 1A:
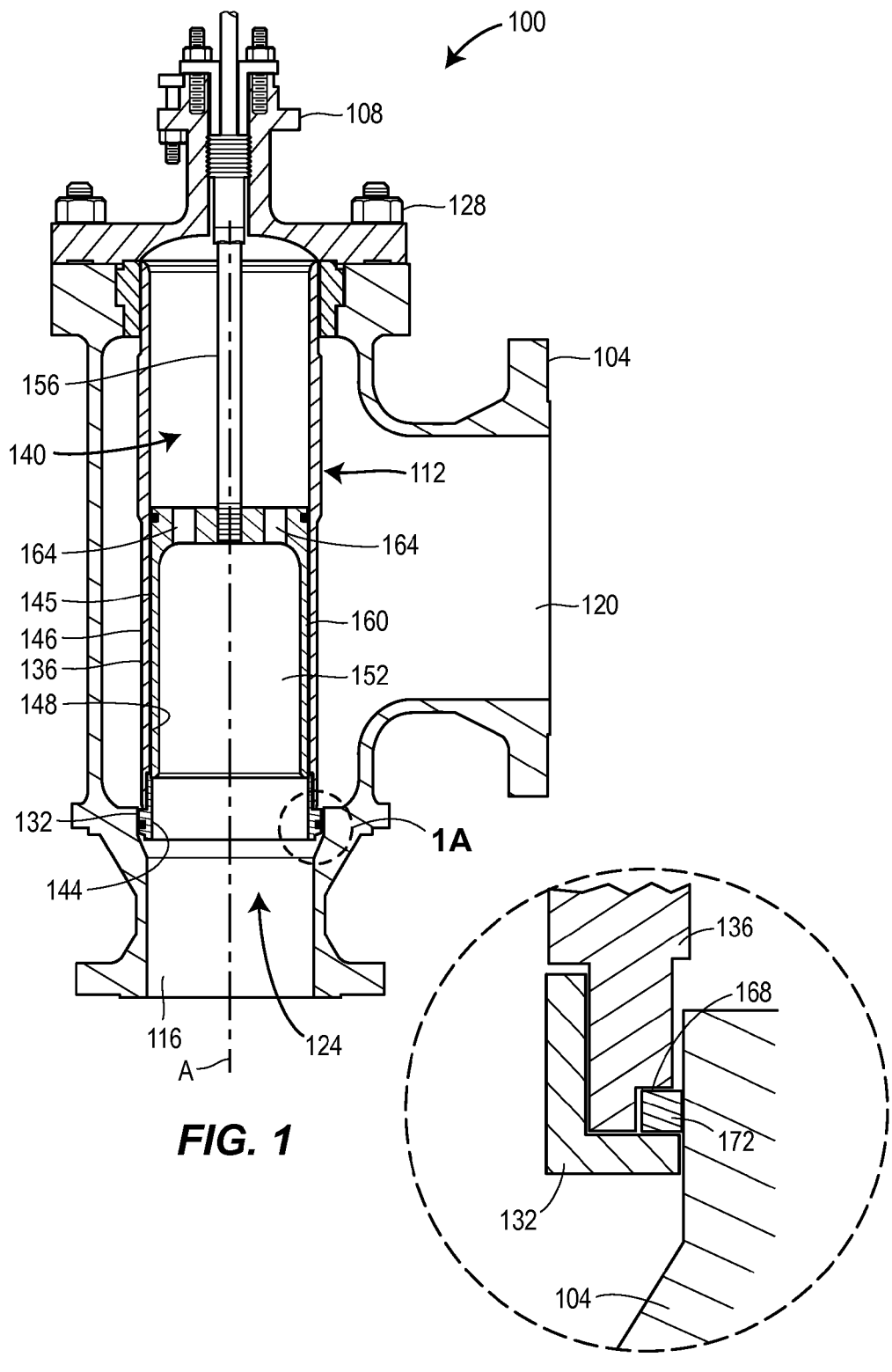
FIG. 1 is a cross-sectional view of a control valve constructed in accordance with the teachings of the disclosure and employing a sealing assembly.
FIG. 1A is an enlarged partial cross-sectional view of a portion of the control valve of FIG. 1.

FIG. 1 depicts a control valve 100 constructed in accordance with the principles of the present invention. The control valve 100 can be a large (e.g., having a port size greater than 6") sliding-stem type control valve (e.g., a Fisher® FB valve) that includes an angle valve body 104, a bonnet 108, and a valve trim assembly 112. The valve body 104 defines an inlet port 116, an outlet port 120, and a fluid flow path 124 extending between the inlet port 116 and the outlet port 120. The bonnet 108 is removably coupled to the valve body 104 via a plurality of fasteners 128. In turn, the bonnet 108 couples the valve body 104 to an actuator (not shown).

Though not specifically illustrated herein, the components of the valve trim assembly 112 can be easily removed (i.e. such components are not welded or threaded in place) from the valve body 104 by removing the bonnet 108. Accordingly, the valve trim assembly 112 can be referred to as a "quick change" valve trim assembly or as having "quick change" characteristics. The valve trim assembly 112 is disposed in the fluid flow path 124 between the inlet 116 and the outlet 120. The valve trim assembly 112 includes a valve seat 132, a one-piece (i.e., unitary) hung valve cage 136, and a plug or stem assembly 140 disposed for displacement in the valve body 104 for controlling the flow of fluid through the fluid flow path 124. The fluid may be a gas (e.g., air, natural gas) or a liquid (e.g., water, liquefied natural gas).

The valve seat 132 is an annular valve seat ring disposed within the valve body 104. The valve seat 132 defines an orifice 144 through which the fluid flow path 124 passes. The valve cage 136 is a generally cylindrical structure that has an interior surface 145 and an exterior surface 146, and defines an interior bore 148. As is known in the art, the valve cage 136 can provide certain flow characteristics of the fluid (e.g., reduces noise and/or cavitation generated by the flow of fluid through the valve 100). To this end, the valve cage 136 can, for example, include one or more passages, apertures, or windows.

The valve cage 136 is generally coupled to the valve seat 132 within the valve body 104. The valve seat 132 and the cage 136 can be bolted or secured together (e.g., via one or more screws), pinned together, threaded to one another, welded to one another, frictionally coupled to one another, or combinations thereof. The valve seat 132 and the valve body 104 are not welded to one another (this would destroy the quick change characteristics of the valve trim assembly).

The plug/stem assembly 140 includes a valve plug 152 connected to a valve stem 156. The valve plug 152 is sized for insertion within the interior bore 148 and is movable along a longitudinal axis A between a closed position (FIG. 1), in which the valve plug 152 is positioned adjacent (e.g., engages) the valve seat 132 to prevent fluid from flowing through the fluid flow path 124, and an open position (not shown), in which the valve plug 152 is positioned or displaced apart or away from the valve seat 132 to allow fluid to flow through the fluid flow path 124. The valve plug 152 depicted in FIG. 1 is a balanced valve plug with an external surface 160 and a pair of through-bores 164. The external surface 160 is a generally cylindrical circumferential surface. The through-bores 164 are in fluid communication with the fluid flow path 124. Accordingly, the pressure in the valve body 104 is balanced on both sides of the valve plug 152, even when the throttling element is in the closed position. The valve stem 156 extends out of the valve body 104 through the bonnet 108 and can be coupled to the actuator (not shown), such that the actuator can adjust the position of the plug/stem assembly 140 and, more particularly, the position of the valve plug 152 relative to the flow path 124 to adjust the flow of fluid through the control valve 100.

In other examples, the control valve 100 can be a different type of control valve, such as, for example, a globe-style control valve, a rotary control valve (e.g., a Fisher® Vee-Ball™ V150 valve, a Fisher® Vee-Ball™ V300 valve, etc.), an isolation valve, or other control valve. Moreover, the components of the control valve 100 (e.g., the valve body 104, the valve seat 132, the valve cage 136, etc.) can vary from what is explicitly depicted herein. For example, the inlet 116, the outlet 120, and the fluid flow path 124 extending therebetween can vary in shape and/or size and yet still perform the intended functionality. As another example, the shape, size, and/or configuration of the valve seat 132 and the valve cage 136 can vary, as will be illustrated below. The valve cage 136 can, for example, be a two-piece cage that includes an upper cage portion and a lower cage portion.

With reference now to FIG. 1A, the control valve 100 further includes an annular gland 168 generally defined by at least one of the valve seat 132 and the valve cage 136. The annular gland 168 is a negative or hollow space, such as, for example, a recess or a partial cavity, in which other components of the control valve 100 can reside. The annular gland 168 can be defined by (e.g., between) the junctions or interfaces between surfaces of the valve seat 132 and the valve cage 136. Depending upon the size, shape, and/or configuration of the valve body 104, the valve seat 132, and the valve cage 136, the gland 168 can have a rectangular cross-section (FIGS. 2 and 3), a square cross-section, an irregularly shaped cross-section (FIGS. 5-8), or some other shaped cross-section. Exemplary glands 168, such as the gland 268, the gland 468, the gland 668, and the gland 868, will be described in connection with FIGS. 2-8 below.

As briefly noted above, components of the control valve 100 are often made of or from different materials. As described herein, the valve body 104 and the components of the valve trim assembly 112 (e.g., the valve seat 132, the valve cage 136) can be made of or from different materials. In other words, the valve body 104 can be made from a first material, while the components of the valve trim assembly 112 (e.g., valve seat 132 and/or the valve cage 136) can be made from a second material different from the first. In some embodiments, the valve seat 132 and the valve cage 136 can be made of different materials.

The valve body 104 can, for example, be made of or from cast iron, brass, carbon steel, alloy steel, stainless steel (e.g., forged stainless steel), various alloys, some other material, or combinations thereof. The valve trim assembly 112 (e.g., the valve seat 132 and/or the valve cage 136) can, for example, be made of or from cast iron, brass, carbon steel, alloy steel, stainless steel (e.g., 316 stainless steel), various alloys, some other material, or combinations thereof. In any event, because different materials have or are associated with different thermal expansion coefficients, the valve body 104 and the components of the valve trim assembly 112 have or are associated with different thermal expansion coefficients. In one example, the valve body 104 is made from Carbon Steel, which has a thermal expansion coefficient of α (e.g., the coefficient equals 10.8 mm/mm/° Celsius at 20 degrees Celsius), and the valve seat 132 and the valve cage 136 are made from Stainless Steel, which has a thermal expansion coefficient of β (e.g., the coefficient equals 17.3 mm/mm/° Celsius at 20 degrees Celsius), β being different than α.

Accordingly, in response to thermal variations (e.g., temperature increases or decreases), the valve body 104 and the valve trim assembly 112 (e.g., the valve seat 132, the valve cage 136) may expand or contract relative to one another along or in a direction parallel to the longitudinal axis A and/or along a transverse axis perpendicular to the longitudinal axis A. In other words, differential thermal expansion or contraction can occur between the valve body 104 and the valve trim assembly 112 in an axial direction and/or in a radial direction. In some cases, this thermal expansion or contraction may be quite significant. Known large control valves, particularly known seals or seal assemblies (e.g., plastic seals) installed in large control valves, are not configured to tolerate such differential thermal expansion or retraction in the axial direction and/or in the radial direction, and any such differential thermal movement may result in significant leakage between the valve body 104 and one or more components of the valve trim assembly 112.

The present disclosure thus provides a sealing assembly 172 that is arranged within the gland 168 to provide a seal between the valve body 104 and the components of the valve trim assembly 112 (e.g., the valve seat 132, the valve cage 136) and to accommodate differential thermal expansion between the valve body 104 and the valve trim assembly 112 in a direction parallel to the longitudinal axis A and in a direction transverse to the longitudinal axis (i.e. in such axial and/or radial directions). The sealing assembly 172 not only accommodates such differential thermal expansion, but the sealing assembly 172 actually exploits or utilizes this differential thermal expansion to fashion an improved seal between the valve body 104 and the valve trim assembly 112 at different (e.g., higher) temperatures. When differential thermal expansion of this nature occurs, the sealing assembly 172 is movable from a first compression state, in which the sealing assembly 172 provides a first radial compression force, to a second compression state in which the sealing assembly 172 provides a second radial compression force, greater than the first radial compression force, such that a stronger seal is affected between the valve body 104 and the components of the valve trim assembly 112.

As will be described in greater detail below, the sealing assembly 172 is formed by or can include one or more seal portions, one or more gaskets, a seal retainer, a packing ring, or combinations thereof. Each of the one or more seal portions generally has a thermal expansion coefficient that is equal to the thermal expansion coefficient of the valve body 104 or one or more components of the valve trim assembly 112. The sealing assembly 172 does not generally include one or more polymer seals (as are used in known control valves), but, in other embodiments, one or more polymer seals can be installed in the valve body 104. One or more sealing rings and/or bushings (e.g., hard carbon bushings) can, for example, be utilized in connection with one or more polymer seals to support the one or more polymer seals. Exemplary sealing assemblies 172, such as the sealing assembly 272, the sealing assembly 472, the sealing assembly 672, and the sealing assembly 872, will be described in connection with FIGS. 2-8 below.

The one or more seal portions, one or more gaskets, the seal retainer, and/or the packing ring can be installed within the gland 168 via fitting (e.g., press fitting), heating or cooling (e.g., shrink fitting), an installation guide or sleeve, or some other way, and/or can be arranged as illustrated in any of FIGS. 2-8 or in a different manner. In some embodiments, the sealing assembly 172 can be disposed elsewhere within the control valve 100. For example, the sealing assembly 172 can be disposed adjacent a top or upper portion of the valve cage 136 spaced away from the valve seat 132).

By providing the sealing assembly 172 described herein, the control valve 100 can thus maintain its "quick change" characteristics while being configured for operation at a service temperature in a range between approximately −325 degrees Fahrenheit (−198.33 degrees Celsius) and approximately 1100 degrees Fahrenheit (593.33 degrees Celsius), and, more particularly, a service temperature in excess of approximately 450 degrees Fahrenheit (232.22 degrees Celsius).

Figure 2:
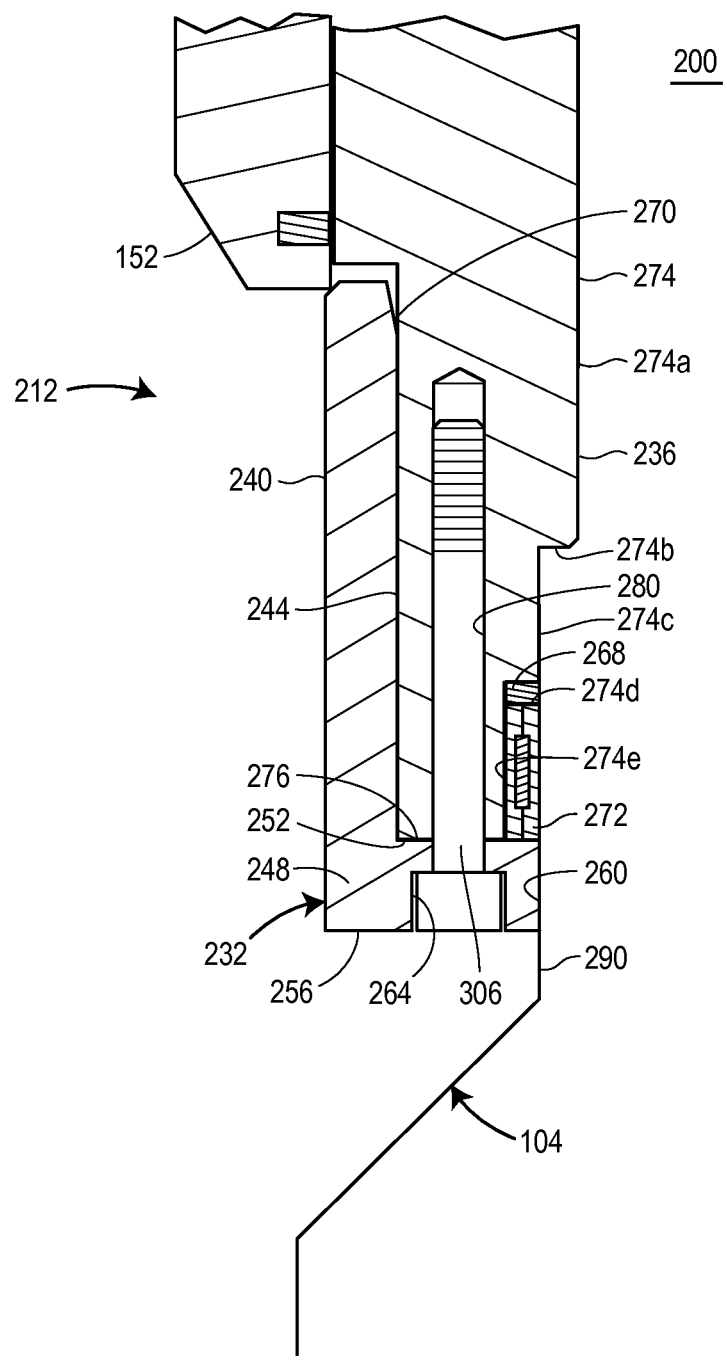
FIG. 2 is an enlarged, partial cross-sectional view of a right-side portion of the control valve of FIG. 1 with a sealing assembly constructed and assembled in accordance with the teachings of a first disclosed example of the present invention.
Figure 3:
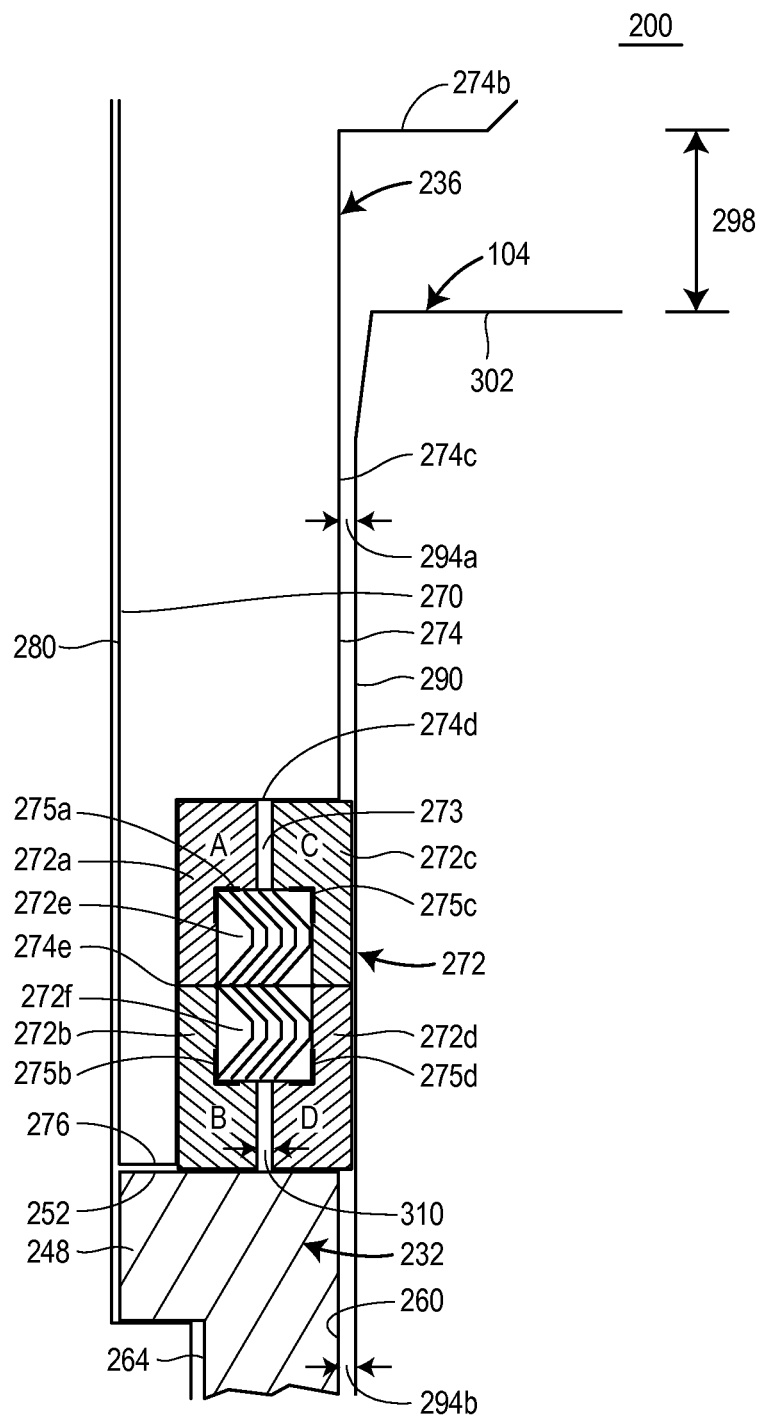
FIG. 3 is an enlarged cross-sectional view of the sealing assembly of FIG. 2.

FIGS. 2 and 3 illustrate a cross-sectional detail view of a right-side portion of an example control valve 200 constructed and assembled in accordance with the teachings of the present invention. The control valve 200 includes the valve body 104 and the valve plug 152 described in FIG. 1, but is implemented with a valve trim assembly 212 and a sealing assembly 272 disposed in a gland 268. The valve trim assembly 212, which is an example of the valve trim assembly 112, includes a valve seat 232 and a valve cage 236.

The valve seat 232 is one example of the valve seat 132. As shown in FIG. 2, the valve seat 232 has an inwardly-facing surface 240, an outwardly-facing surface 244, and an outwardly-extending annular flange 248. The annular flange 248 has a top surface 252, a bottom surface 256, an outwardly-facing surface 260 that extends therebetween, and an aperture 264 that is defined by and extends through the top surface 252 and the bottom surface 256.

The valve cage 236 is one example of the valve cage 136 shown in FIG. 1. As shown in FIG. 2, the valve cage 236 has an inwardly-facing surface 270, an outwardly-facing surface 274, a bottom surface 276, and an aperture 280 that is defined by and extends through the bottom surface 276 and extends into the valve cage 236. The outwardly-facing surface 274 includes a first longitudinally extending surface 274a, a first stepped portion 274b, a second longitudinally extending surface 274c, a second stepped portion 274d, and a third longitudinally extending surface 274e. The second surface 274c is positioned radially inward of the first surface 274a, and the third surface 274e is positioned radially inward of the second surface 274c. The first stepped portion 274b extends between and connects the first and second surfaces 274a, 274c. The second stepped portion 274d extends between and connects the second and third surfaces 274c, 274e.

As shown in FIG. 3, the valve seat 232 and the valve cage 236 generally define the gland 268. More specifically, the gland 268 is defined by the top surface 252 of the annular flange 248 and the second stepped portion 274d and the third surface 274e of the outwardly-facing surface 274.

FIG. 3 also illustrates further details about the sealing assembly 272, which is one example of the sealing assembly 172 of FIG. 1. As shown in FIG. 3, the sealing assembly 272 is a six-piece sealing assembly that includes a first seal portion 272a, a second seal portion 272b, a third seal portion 272c, a fourth seal portion 272d, a first biasing element 272e, and a second biasing element 272f. The first and second seal portions 272a, 272b are made of or from the same material as the valve cage 236, such that the first and second seal portions 272a, 272b have a thermal expansion coefficient that is approximately equal to the thermal expansion coefficient of the valve cage 236. The third and fourth seal portions 272c, 272d are made of or from the same material as the valve body 104, such that the third and fourth seal portions 272c, 272d have a thermal expansion coefficient that is approximately equal to the thermal expansion coefficient of the valve body 104. The biasing elements 272e, 272f depicted in FIG. 3 are spiral wound gaskets and are made of graphite and metal windings, but the biasing elements 272e, 272f can, in other embodiments, be a different type of biasing element and/or be made of a compliant metal or another suitable material. In other examples, the biasing elements 272e, 272f can be combined into one biasing element (e.g., one spiral wound gasket).

As shown in FIG. 3, the sealing assembly 272 is arranged in the gland 268. The first and second seal portions 272a, 272b are disposed adjacent portions of the valve cage 236. In particular, the first seal portion 272a is disposed immediately adjacent the second stepped portion 274d and the third surface 274e of the valve cage 236, while the second seal portion 272b is disposed in contact with and directly below the first seal portion 272a and immediately adjacent the third surface 274e of the valve cage 236 and the top surface 252 of the annular flange 248. The third seal portion 272c is disposed immediately adjacent the second stepped portion 274d of the valve cage 236, while the fourth seal portion 272d is disposed immediately adjacent the top surface 252 of the annular flange 248. As shown in FIG. 3, the gaskets 272e, 272f are disposed within an annular groove 273 formed by and between the seal portions 272a-272d. In this position, the first gasket 272e engages (e.g., contacts) an L-shaped interior surface 275a of the first seal portion 272a and an L-shaped interior surface 275c of the third seal portion 272c, and the second gasket 272f, which engages or contacts the first gasket 272e, engages or contacts an L-shaped interior surface 275b of the second seal portion 272b and an L-shaped interior surface 275d of the fourth seal portion 272d. So configured, the first and second gaskets 272e, 272f are sandwiched and restrained between the seal portions 272a-272d. More particularly, the gasket 272e is axially and radially restrained by the L-shaped interior portions 275a, 275c and the second gasket 272f. The second gasket 272f is axially and radially restrained by the L-shaped portions 275b, 275d and the first gasket 272e.

First and second gaskets 272e, 272f are sandwiched by and restrained between the seal portions 272a-272d, both in a radial direction and an axial (e.g., longitudinal) direction. As such, the first and second gaskets 272e, 272f can exert radial and/or axial forces on the seal portions 272a-272d, as will be described in greater detail below.

As shown in FIGS. 2 and 3, when the valve seat 232 and the valve cage 236 are disposed in the valve body 104, (i) the outwardly-facing surface 244 of the valve seat 232 is positioned immediately adjacent the inwardly-facing surface 270 of the valve cage 236, (ii) the top surface 252 of the annular flange 248 is positioned immediately adjacent the bottom surface 276 of the valve cage 236, (iii) the aperture 264 of the valve seat 232 is aligned (e.g., co-axial) with the aperture 280 of the valve cage 236, (iv) the second surface 274c of the valve cage is positioned adjacent an inwardly-facing surface 290 of the valve body 104, (v) the outwardly-facing surface 260 of the annular flange 248 is positioned adjacent a different portion of the inwardly-facing surface 290 of the valve body 104, and (vi) the third and fourth seal portions 272c, 272d are disposed adjacent portions of the valve body 104, particularly portions of the inwardly-facing surface 290 of the valve body 104.

So arranged, an upper horizontal (e.g., radial) gap 294a (FIG. 3) is formed between the inwardly-facing surface 290 of the valve body 104 and the second surface 274c of the valve cage 236 and between the inwardly-facing surface 290 of the valve body 104 and the outwardly-facing surface 260 of the annular flange 248, and a vertical or axial gap 298 is formed between a horizontally-extending surface 302 of the valve body 104 and the first stepped portion 274b of the valve cage 236. A lower horizontal (e.g., radial) gap 294b is formed between the inwardly-facing surface 290 of the valve body 104 and outwardly-facing surface 260 of the annular flange 248. The size of the upper and lower gaps 294a and 294b can be generally equal to the maximum amount of thermal expansion that is permitted in the transverse or radial direction (i.e., the direction transverse to the longitudinal axis A shown in FIG. 1). The size of the gap 298 can be generally equal to the maximum amount of thermal expansion that is permitted in the longitudinal or axial direction (i.e., the direction parallel to the longitudinal axis A). In this example, the upper and lower gaps 294a and 294b are equal to approximately 0.020 inches and the gap 298 is equal to approximately 0.25 inches. To accommodate greater or less thermal expansion in the radial and/or axial direction, the size of the upper and lower gaps 294a and 294b and/or the gap 298 can be adjusted.

With reference back to FIG. 2, the valve seat 232 is screwed or bolted to the valve cage 236 via a plurality of screws or fasteners 306 (e.g., a plurality of socket head cap screws). This, in turn, compresses portions of the sealing assembly 272. More particularly, the gaskets 272e, 272f are compressed to the desired height and diameter by the seal portions 272a-272d within the gland 268. The gaskets 272e, 272f can be compressed to a different height and/or diameter by, for example, adjusting the size and/or shape of the seal portions 272a-272d. In any event, the gaskets 272e, 272f are sufficiently compressed so that the gaskets 272e, 272f can generate a radial force that is sufficient to affect a tight seal between the valve body 104 and the components of the valve trim assembly 212 (e.g., the valve seat 232, the valve cage 236). When the valve seat 232 and the valve cage 236 are screwed or bolted together, the third and fourth seal portions 272c, 272d are pushed or biased radially outward toward and against the inwardly-facing surface 290 of the valve body 104, such that a tight seal is affected between the valve body 104 and the valve trim assembly 212 and a horizontal or radial gap 310 is formed between (i) the first seal portion 272a and the third seal portion 272c, and (ii) the second seal portion 272b and the fourth seal portion 272d (see FIG. 3). The gap 310 can be substantially equal to the gap 294 described above. This arrangement is also referred to herein as the first compression state.

With reference again to FIG. 3, as the operating temperature increases, the valve body 104, having a first thermal expansion coefficient, expands at a different rate than the valve seat 232 and the valve cage 236, which have a second thermal expansion coefficient different than the first thermal expansion coefficient. In other words, as the operating temperature of the control valve 200 increases, differential thermal expansion occurs between the valve body 104 and the valve seat 232 and the valve cage 236. The sealing assembly 272 not only accommodates, but exploits this differential thermal expansion to provide an improved seal. Differential thermal expansion between the valve body 104 and the valve seat 232 and the valve cage 232 moves the sealing assembly 272 to a second compression state, which drives or pushes the first and second seal portions 272a, 272b and the third and fourth seal portions 272c, 272d towards one another, compressing the gaskets 272e, 272f in the radial direction, closing at least a portion of the gap 310, which is equivalent to the gap 294. In turn, the gaskets 272e, 272f exert an increased radial compression force (as compared to the pre-expansion radial force), thereby producing higher contact stresses and affecting a more effective seal between the valve body 104 and the valve trim assembly 212. This thermal expansion also drives or pushes the first and third seal portions 272a, 272c towards the second and fourth seal portions 272b, 272d, compressing the gaskets 272e, 272f in the axial direction, closing at least a portion of the gap 298, and further increasing the radial compression force applied by the gaskets 272e, 272f. As the first and second seal portions 272a, 272b have the same thermal expansion coefficient as the valve seat 232 and the cage 236, the first and second seal portions 272a, 272b expand at the same rate as the valve seat 232 and the valve cage 236. Likewise, as the third and fourth seal portions 272c, 272d have the same thermal expansion coefficient as the valve body 104, the third and fourth seal portions 272c, 272d expand at the same rate as the valve body 104. As a result, the contact stresses at the inner diameter of the sealing assembly 272 and at the outer diameter of the sealing assembly 272 are substantially uniform.

Alternatively, the first and/or second seal portions 272a, 272b can be made of a material that has slightly different thermal expansion characteristics than the valve trim assembly 212, and the third and/or fourth seal portions 272c, 272d can be made of a material that has slightly different thermal expansion characteristics than the valve body 104. For example, the seal portions 272a, 272b, and 272c, 272d can be made from materials having higher thermal expansion coefficients than the valve cage 236 and the valve body 104, respectively. In any event, by selecting material(s) for the seal portions 272a, 272b, 272c, and/or 272d that have different thermal expansion characteristics, higher contact stresses may be produced at the inner diameter and/or the outer diameter of the sealing assembly 272. These higher stresses can increase the sealing performance of the sealing assembly 272 and/or enhance the longevity of the sealing assembly 272 and/or components thereof.

In this way, the sealing assembly 272 exploits differential thermal expansion between the valve body 104 and the components of the valve trim assembly 212 in both the axial direction and the radial direction to provide and maintain an improved and tight seal between the valve body 104 and the components of the valve trim assembly 212 at different (e.g., higher) temperatures.

Figure 4:
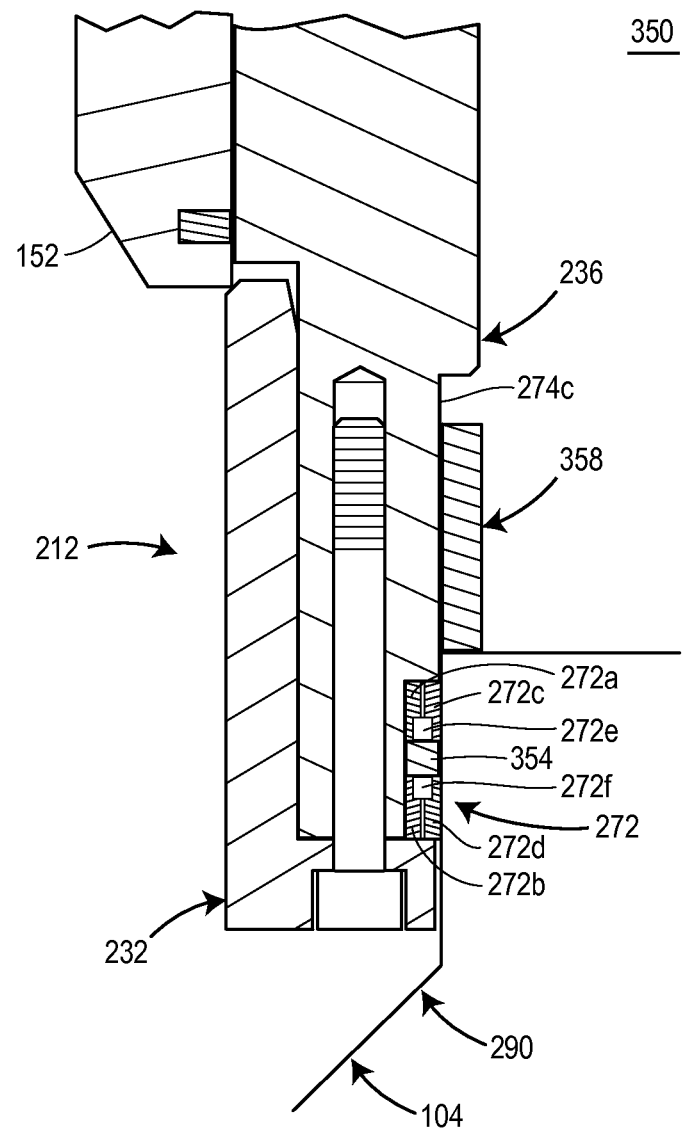
FIG. 4 is an enlarged, partial, cross-sectional view of a right-side portion of the control valve of FIG. 1 with a sealing assembly constructed and assembled in accordance with the teachings of a second disclosed example of the present invention.

FIG. 4 illustrates a cross-sectional view of a right-side portion of another example control valve 350 constructed and assembled in accordance with the teachings of the present invention. The control valve 350 is essentially identical to the control valve 200 and has the same components referenced by common reference numbers. The control valve 350 includes a sealing ring 354. The sealing ring 354 is made of graphite but can be made of a different material.

As shown in FIG. 4, the components of the sealing assembly 272 and the sealing ring 354 are disposed within the valve body 104. The components of the sealing assembly 272 and the sealing ring 354 can be installed via or using an axially-slidable installation sleeve 358. Though not depicted in FIG. 4, the sealing assembly 272 and the sealing ring 354 are, initially, partially disposed within the valve body 104 with the valve trim assembly 212 disposed adjacent or against the sleeve. As the valve trim assembly 212 is disposed further within the valve body 104, the sleeve 358 is held tightly against the valve body 104 by or due to friction generated by the components of the sealing assembly 272 and the sealing ring 354; at the same time, the sleeve 358 slides upward along the second longitudinal surface 274c of the valve cage 236. The sealing assembly 272 and the sealing ring 354 are forced into the valve body 104 and ultimately reach the fully assembled position shown in FIG. 4.

Once installed, the sealing ring 354 is disposed between (i) a top portion of the sealing assembly 272 that includes the first and third seal portions 272a, 272c and the gasket 272e, and (ii) a bottom portion of the sealing assembly 272 that includes the second and fourth seal portions 272b, 272d and the gasket 272f. So arranged, the sealing ring 354 is configured to further reduce any leakage between the valve seat 232 and the valve body 104. When the gaskets 272e, 272f are compressed as described above, the gaskets 272e, 272f compress the sealing ring 354 and bias the sealing ring 354 toward and against the valve body 104, such that the sealing ring 354 can also serve to provide a tight seal between the valve body 104 and the components of the valve trim assembly 212 (e.g., the valve cage 236). At the same time, the gaskets 272e, 272f protect the sealing ring 354 from extrusion, which would deform and inhibit the sealing ability of the sealing ring 354.

Figure 5:
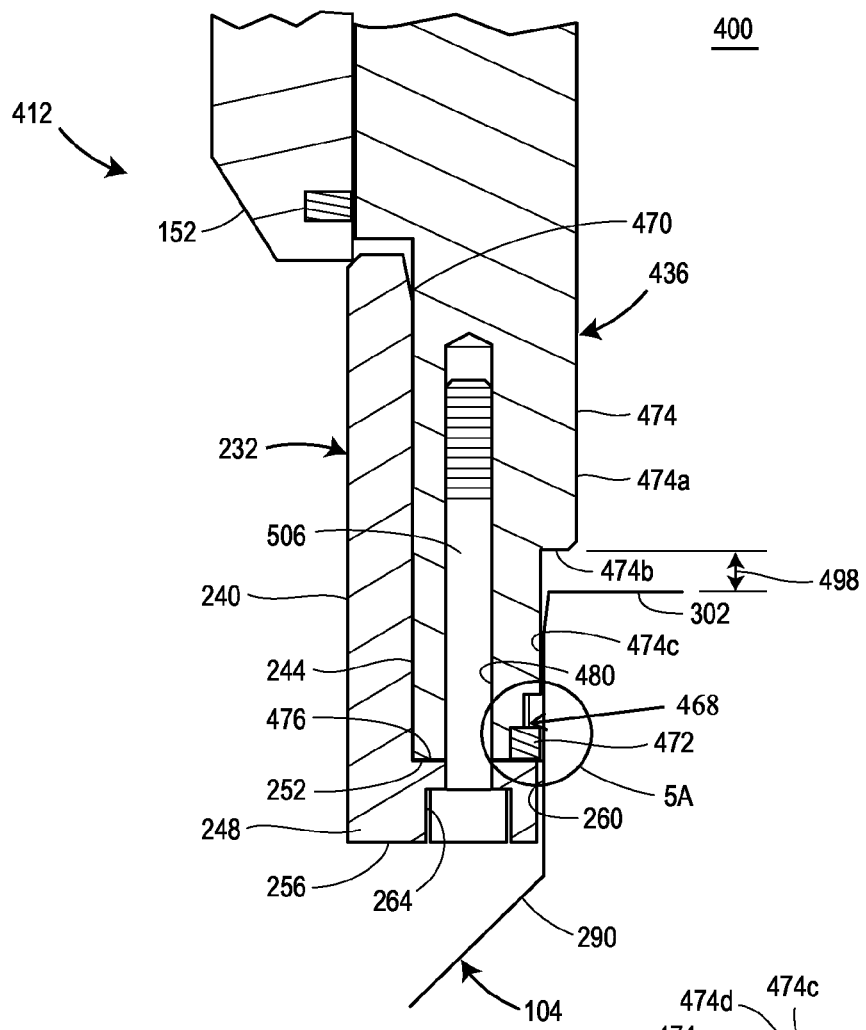
FIG. 5 is an enlarged, partial cross-sectional view of a right-side portion of the control valve of FIG. 1 with a sealing assembly constructed and assembled in accordance with the teachings of a third disclosed example of the present invention.

FIG. 5 illustrates a cross-sectional view of a right-side portion of an example control valve 400 constructed and assembled in accordance with the teachings of the present invention. The control valve 400 is similar to the control valve 200 and has the same components referenced by common reference numbers. The control valve 400 includes the valve body 104 and the valve plug 152, but is implemented with a valve trim assembly 412 and a sealing assembly 472 disposed in a gland 468. The valve trim assembly 412, which is an example of the valve trim assembly 112, includes the valve seat 232 and a valve cage 436.

Figure 5A:
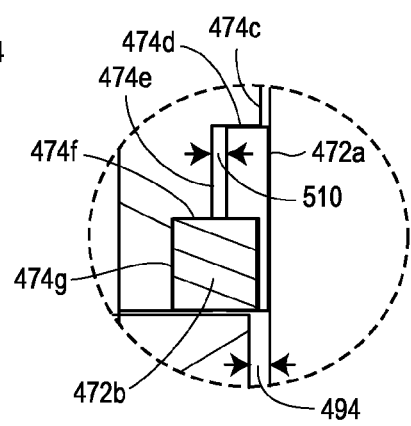
FIG. 5A is an enlarged cross-sectional view of the sealing assembly of FIG. 5.

The valve cage 436 is another example of the valve cage 136. The valve cage 436 is similar to the valve cage 236 described in connection with FIGS. 2 and 3, but has a slightly different configuration than the valve cage 236. As shown in FIG. 5, the valve cage 436 has an inwardly-facing surface 470, an outwardly-facing surface 474, a bottom surface 476, and an aperture 480 that is defined by and extends through the bottom surface 476 and extends into the valve cage 436. As shown in FIGS. 5 and 5A, the outwardly-facing surface 474 includes a first longitudinally extending surface 474a, a first stepped portion 474b, a second longitudinally extending surface 474c, a second stepped portion 474d, a third longitudinally extending surface 474e, a third stepped portion 474f, and a fourth longitudinally extending surface 474g. The second surface 474c is positioned radially inward of the first surface 474a, the third surface 474e is positioned radially inward of the second surface 474c, and the fourth surface 474g is positioned radially inward of the third surface 474e. The first stepped portion 474b extends between and connects the first and second surfaces 474a, 474c. The second stepped portion 474d extends between and connects the second and third surfaces 474c, 474e. The third stepped portion 474f extends between and connects the third and fourth surfaces 474e, 474g.

As shown in FIGS. 5 and 5A, the valve seat 232 and the valve cage 436 define the gland 468. More specifically, the gland 468 is defined by the top surface 252 of the annular flange 248 and the second stepped portion 474d, the third surface 474e, the third stepped portion 474f, and the fourth surface 474g of the outwardly-facing surface 474.

The sealing assembly 472 is another example of the sealing assembly 172. As shown in FIG. 5, the exemplary sealing assembly 472 is a two-piece sealing assembly that includes a seal 472a and a biasing element 472b. The seal 472a is made of or from the same material as the valve body 104, such that the seal 472a has a thermal expansion coefficient that is approximately equal to the thermal expansion coefficient of the valve body 104. The biasing element 472b, like the biasing element 272e or 272f, is a spiral wound gasket made of graphite and metal windings. In other examples, the seal 472a can be made of or from the same material as the valve cage 436, such that the seal 472a has a thermal expansion coefficient that is approximately equal to the thermal expansion coefficient of the valve cage 436. Likewise, the biasing element 472b can be a different biasing element and/or be made of a different material, such as a compliant metal or another suitable material.

The sealing assembly 472 is arranged in the gland 468. The seal 472a is disposed immediately adjacent the second stepped portion 474d of the valve cage 436. The gasket 472b is disposed adjacent and radially inward of the seal 472a and adjacent portions of the valve cage 436. In particular, the gasket 472b is disposed immediately adjacent the third stepped portion 474f of the valve cage 436, the fourth surface 474f of the valve cage 436, and the top surface 252 of the annular flange 248. In some embodiments, the gasket 472b is integrally machined to the valve cage 436, such that it is disposed in this position when the sealing assembly 472 is arranged in the gland 468.

The valve seat 232, the valve cage 436, and the sealing assembly 472 are disposed in the valve body 104 in a manner similar to how the valve seat 232, the valve cage 236, and the sealing assembly 272 are disposed in the valve body 104, as described above in connection with FIGS. 2 and 3. So arranged, the seal 472a is disposed immediately adjacent the inwardly-facing surface 290 of the valve body 104, a horizontal or radial gap 494 is formed between the inwardly-facing surface 290 of the valve body 104 and the second surface 474c of the valve cage 436 and between the inwardly-facing surface 290 of the valve body 104 and the outwardly-facing surface 260 of the annular flange 248, and a vertical or axial gap 498 is formed between a horizontally-extending surface 302 of the valve body 104 and the first stepped portion 474b of the valve cage 436 (see FIG. 5). The size of the gap 494 is generally equal to the maximum amount of thermal expansion permitted in the transverse or radial direction (i.e., the direction perpendicular to the longitudinal axis A shown in FIG. 1). The size of the gap 498 is generally equal to the maximum amount of thermal expansion permitted in the longitudinal or axial direction (i.e., the direction parallel to the longitudinal axis A). In this example, the gap 494 is equal to approximately 0.020" and the gap 498 is equal to approximately 0.25". To accommodate greater or less thermal expansion in the radial and/or axial direction, the size of the gaps 494 and/or 498 can be adjusted.

The valve seat 232 is screwed or bolted to the valve cage 436 via a plurality of screws or fasteners 506 (e.g., a plurality of socket head cap screws). This, in turn, compresses the gasket 472b to the desired height and diameter. The gasket 472b can be compressed to a different height and/or diameter by, for example, adjusting the size and/or shape of the seal 472a. In any event, the gasket 472b is sufficiently compressed so that the gasket 472b can generate a radial force that is sufficient to affect a tight seal between the valve body 104 and the valve trim assembly 412. When the valve seat 232 and the valve cage 436 are screwed or bolted together, the seal 472a is pushed or biased radially outward toward and against (e.g., in contact with) the inwardly-facing surface 290 of the valve body 104, such that a tight seal is affected between the valve body 104 and the components of the valve trim assembly 412 and a horizontal or radial gap 510 is formed between an inwardly facing surface of the seal 472a and the third surface 474e of the valve cage 436. The gap 510 is substantially equal to the gap 494 described above. This arrangement is referred to herein as the first compression state.

As the operating temperature of the control valve 400 increases, the valve body 104, having a first thermal expansion coefficient, expands at a different rate than the valve seat 232 and the valve cage 436, which have a second thermal expansion coefficient different than the first thermal expansion coefficient. In other words, as the operating temperature of the control valve 400 increases, differential thermal expansion occurs between the valve body 104 and the valve seat 232 and the valve cage 436. As with the sealing assembly 272 described above, the sealing assembly 472 exploits or utilizes this differential thermal expansion to provide a higher-performance seal. Differential thermal expansion between the valve body 104 and the valve seat 232 and the valve cage 436 moves the sealing assembly 472 to a second compression state, which drives or pushes the seal 472a towards the gasket 472b in the radial direction, compressing the gasket 472b and closing at least a portion of the gap 510. In turn, the gasket 472b exerts an increased radial force (as compared to the pre-expansion radial force), thereby producing higher contact stresses and affecting an improved seal between the valve body 104 and the components of the valve trim assembly 412. This differential thermal expansion also drives or pushes the seal 472a and the gasket 472b toward one another in the axial direction, compressing the gasket 472b, closing at least a portion of the gap 498, and further increasing the radial compression force applied by the gasket 472b. As the seal 472a has the same thermal expansion coefficient as the valve body 104, the seal 472a expands at the same rate as the valve body 104.

In this way, the seal assembly 472 exploits differential thermal expansion between the valve body 104 and the components of the valve trim assembly 412 in both the axial direction and the radial direction to provide and maintain an improved and tight seal between the valve body 104 and the components of the valve trim assembly 412 at different (e.g., higher) temperatures.

FIG. 6 illustrates a cross-sectional view of a right-side portion of another example control valve 600 constructed and assembled in accordance with the teachings of the present invention. The control valve 600 is similar to the control valves 200, 400 and has the same components referenced by common reference numbers. The control valve 600 includes the valve body 104 and the valve plug 152, but is implemented with a valve trim assembly 612 and a sealing assembly 672 disposed in a gland 668. The valve trim assembly 612, which is another example of the valve trim assembly 112, includes valve seat 632 and valve cage 636.

The valve seat 632 is another example of the valve seat 132. The valve seat 632 is similar to the valve seat 232, but has a slightly different configuration than the valve seat 232. The valve seat 632 has an inwardly-facing surface 640, an outwardly-facing surface 644, and an outwardly extending annular flange 648. The inwardly-facing surface 640 is essentially identical to the inwardly-facing surface 240 of the valve seat 232. The outwardly-facing surface 644 and the flange 648 are, however, different than the corresponding parts of the valve seat 232. The outwardly-facing surface 644 has a first longitudinally extending surface 644a, a stepped portion 644b, and a second longitudinally extending surface 644c. The stepped portion 644b extends between and connects the first surface 644a and the second surface 644c, which is positioned radially outward of the first surface 644a, such that the valve seat 632 is wider between the inwardly-facing surface 640 and the second surface 644c than between the inwardly-facing surface 640 and the first surface 644a. The valve seat 632 further includes a threaded portion 644d on or along the second longitudinally extending surface 644c.

The annular flange 648 has a top surface 652, a bottom surface 656, a bore 658, an outwardly-facing surface 660, and an annular groove 662. The bore 658 is defined by and extends through the bottom surface 656 and extends into and through the annular flange 648. The annular groove 662 is defined by the top surface 652 and the outwardly-facing surface 660, and has an L-shaped cross-section.

The valve cage 636 is another example of the valve cage 136. The valve cage 636 is similar to the valve cage 436 described in connection with FIG. 5, but has a slightly different configuration. As shown in FIG. 6, the valve cage 636 has an inwardly-facing surface 670, an outwardly-facing surface 674, and a bottom surface 676. As shown in FIGS. 6 and 6A, the inwardly-facing surface 670 includes a first longitudinally extending surface 670a, a first stepped portion 670b, a second longitudinally extending surface 670c, a second stepped portion 670d, and a third longitudinally extending surface 670e. The second surface 670c is positioned radially outward of the first surface 670a, and the third surface 670e is positioned radially outward of the second surface 670c. The first stepped portion 670b extends between and connects the first and second surfaces 670a, 670c. The second stepped portion 670d extends between and connects the second and third surfaces 670c, 670e. The valve cage 636 further includes a threaded portion 670f on or along the third surface 670e. The outwardly-facing surface 674 and the bottom surface 676 are essentially identical to the outwardly-facing surface 474 and the bottom surface 476, respectively, of the valve cage 436 described in FIG. 5.

As shown in FIG. 6A, the valve seat 632 and the valve cage 636 generally define the gland 668, which is another example of the gland 168. More specifically, the gland 668 is defined by the groove 662 of the annular flange 648 and the second stepped portion 674d, the third surface 674e, the third stepped portion 674f, and the fourth surface 674g of the outwardly-facing surface 674.

The sealing assembly 672 is another example of the sealing assembly 172. As shown in FIG. 6A, the exemplary sealing assembly 672 is a three-piece sealing assembly that includes a seal 672a, a biasing element 672b, and a seal retainer 672c. The seal 672a and the biasing element 672b are similar to the seal 472a and the biasing element 472b, respectively, of the sealing assembly 472 described in FIG. 5. The seal retainer 672c is an annular seal retainer that has a rectangular cross-section.

The sealing assembly 672 is arranged in the gland 668 in a manner similar to how the sealing assembly 472 is arranged in the gland 468. Specifically, the seal 672a and the biasing element 672b are arranged in the same way as the seal 472a and the biasing element 472b, respectively. The seal retainer 672c is partially disposed in the groove 662 of the annular flange 648, such that the seal retainer 672c is disposed immediately adjacent (e.g., in contact with) an underside of the seal 672a. As such, the seal retainer 672c is configured to compress the biasing element 672b. In some embodiments, a fixture (e.g., a screw, a pin, etc.) may be used to compress the biasing element 672b, with the seal retainer 672c, to the desired height and/or diameter.

When the valve seat 632, the valve cage 636, and the sealing assembly 672 are disposed in the valve body 104, (i) the outwardly-facing surface 644 of the valve seat 632 is positioned immediately adjacent the inwardly-facing surface 670c of the valve cage 636, (ii) the threaded portion 644d of the valve seat 632 engages the threaded portion 670f of the valve cage 636, (iii) the seal 672a is disposed immediately adjacent (e.g., in contact with) the inwardly-facing surface 290 of the valve body 104, and (iv) the seal retainer 672c is disposed immediately adjacent a different portion of the inwardly-facing surface 290 of the valve body 104. So arranged, a horizontal or radial gap 694 and a vertical or axial gap 698 are formed in the control valve 600. The gaps 694, 698 are substantially identical to the gaps 494 and 498 described above in FIG. 5.

Unlike the previously described embodiments, in which the seat ring and the cage were screwed or bolted together, the valve seat 632 and the valve cage 636 are threaded together (via the threaded portions 644d, 644f) and pinned together via a plurality of pins (not shown). This type of connection obviates the need for seat ring bolts, which can be quite costly. In any event, the pinning action causes the seal retainer 672c to retain compression of the biasing element 672b at the desired height and diameter, such that the biasing element 672b is configured to generate a radial force that is sufficient to affect a tight seal between the valve body 104 and the valve seat 632. When the valve seat 632, the valve cage 636, and the sealing assembly 672 are disposed within the valve body 104, the seal 672a is pushed or biased radially outward toward and against (e.g., in contact with) the inwardly-facing surface 290 of the valve body 104, such that a horizontal or radial gap 710 is formed between an inwardly facing surface of the seal 672a and the third surface 674e of the valve cage 636. The gap 710 is substantially equal to the gap 694 described above. This arrangement is also referred to herein as being the first compression state.

Arranged in this way, the control valve 600 operates in a manner similar to the control valves 200, 400 described above. As such, the sealing assembly 672 is arranged to exploit differential thermal expansion between the valve body 104 and the components of the valve trim assembly 612 in both the axial and the radial directions to provide an improved and tight seal between the valve body 104 and the components of the valve trim assembly 612 at different (e.g., higher) temperatures.

Figures 7, 7A:
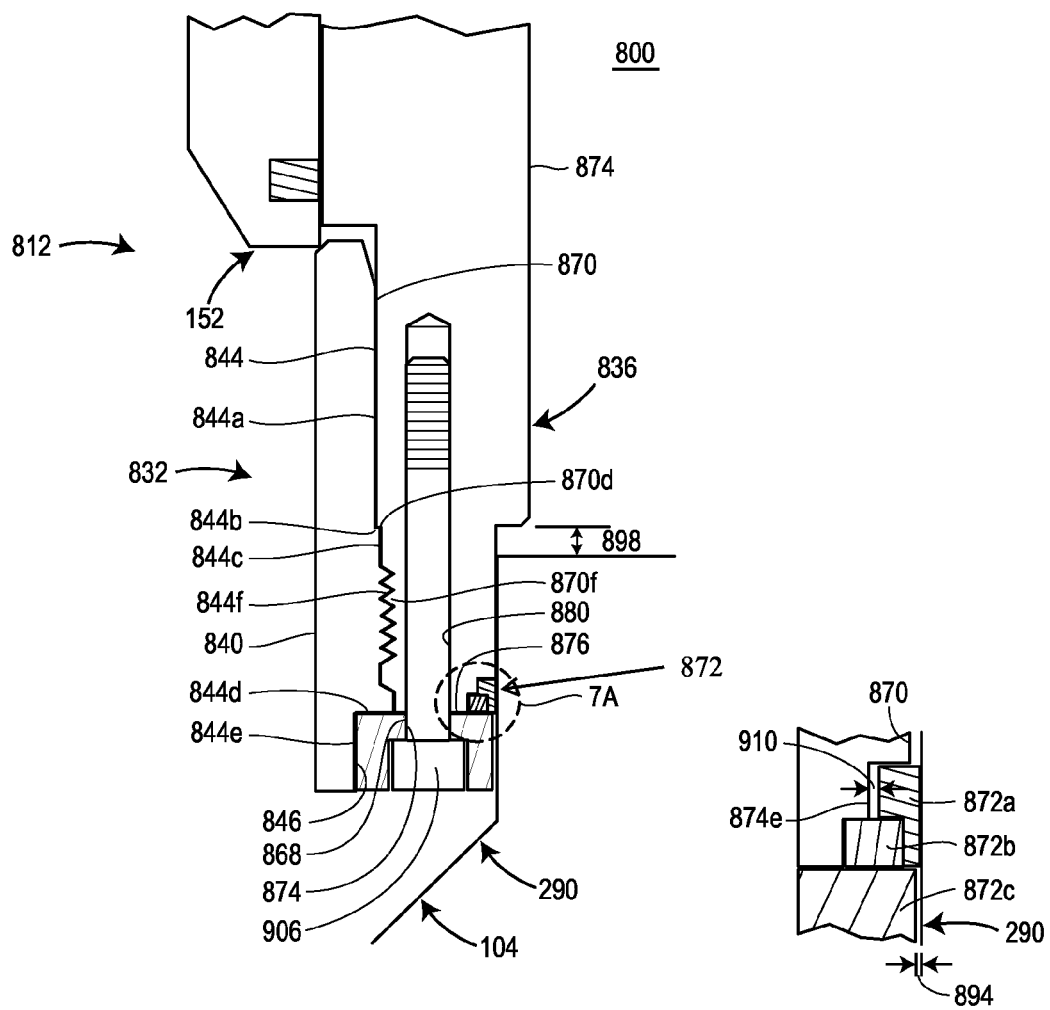
FIG. 7 is an enlarged, partial cross-sectional view of a right-side portion of the control valve of FIG. 1 with a sealing assembly constructed and assembled in accordance with the teachings of a fifth disclosed example of the present invention.
FIG. 7A is an enlarged cross-sectional view of the sealing assembly of FIG. 7.

FIG. 7 illustrates a cross-sectional view of a right-side portion of another example control valve 800 constructed and assembled in accordance with the teachings of the present invention. The control valve 800 is similar to the control valves 200, 400, 600 and has the same components referenced by common reference numbers. The control valve 800 includes the valve body 104 and the valve plug 152, but is implemented with a valve trim assembly 812 and a sealing assembly 872 disposed in a gland 868. The valve trim assembly 812, which is another example of the valve trim assembly 112, includes valve seat 832 and valve cage 836.

The valve seat 832 is a further example of the valve seat 132. The valve seat 832 is similar to the valve seat 632 described in connection with FIG. 6, but has a slightly different configuration than the valve seat 632. The valve seat 832 has an inwardly-facing surface 840 and an outwardly-facing surface 844. The inwardly-facing surface 840 is essentially identical to the inwardly-facing surface 640. The outwardly-facing surface 844, like the outwardly-facing surface 644, has a first longitudinally extending surface 844a, a first stepped portion 844b, a second longitudinally extending surface 844c, and a threaded portion 844f. The surface 844c is positioned radially outward of the surface 844a. The stepped portion 844b, which is shorter than the stepped portion 644b, extends between and connects the first surface 844a and the second surface 844c. The threaded portion 844f is positioned on or along the second surface 844c, as shown in FIG. 7. Instead of the seat ring 832 having an outwardly extending annular flange (as the seat rings 232, 632 do), the inwardly-facing surface 844 also includes a second stepped portion 844d and a third longitudinally extending surface 844e, and defines an annular groove 846. The third surface 844e is positioned radially inward of both the surfaces 844a and 844c. The second stepped portion 844d connects and extends between the surfaces 844c and 844e. The annular groove 846 is defined by the second stepped portion 844d and the third surface 844e, and has an L-shaped cross-section.

The valve cage 836 is another example of the valve cage 136. The valve cage 836 is similar to the valve cage 636 described in connection with FIG. 6, but has a slightly different configuration. As shown in FIGS. 7 and 7A, the valve cage 836 has an inwardly-facing surface 870, an outwardly-facing surface 874, a bottom surface 876, and an aperture 880. With reference to FIG. 7A, the inwardly-facing surface 870 is slightly different than the inwardly-facing surface 670 because it has a second stepped portion 870d that is shorter than the second stepped portion 670d in the radial direction in order to accommodate the shorter stepped portion 844b of the valve seat 836. The outwardly-facing surface 874 and the bottom surface 876 are essentially identical to the outwardly-facing surface 674 and the bottom surface 676, respectively, of the valve seat 636. The aperture 880, which is similar to the aperture 480 described in connection with FIG. 5, is defined by and extends through the bottom surface 878 and extends into the valve cage 836.

As shown in FIG. 7A, the valve seat 832 and the valve cage 836 define the gland 868, which is yet another example of the gland 168. The gland 868 is substantially similar to the gland 668, but instead of being partially defined by an annular flange (as the gland 668 is), the gland 868 is partially defined by the outwardly-facing surface 844 of the valve seat 832, particularly the annular groove 846 of the valve seat 832.

The sealing assembly 872 is yet another example of the sealing assembly 172. As shown in FIG. 7A, the exemplary sealing assembly 872 is, like the sealing assembly 672, a three-piece sealing assembly that includes a seal 872a, a biasing element 872b, and a seal retainer 872c. The seal 872a and the biasing element 872b are similar to the seal 672a and the gasket 672b, respectively, of the sealing assembly 672. The seal retainer 872c, like the seal retainer 672c, is an annular seal retainer, but the seal retainer 872c has an aperture 874 that is defined by and extends through top and bottom surfaces of the seal retainer 872c.

The sealing assembly 872 is arranged in the gland 868 in a manner similar to how the sealing assembly 672 is arranged in the gland 668. Specifically, the seal 872a and the biasing element 872b are arranged in the same way as the seal 672a and the biasing element 672b, respectively. As shown in FIG. 7, the seal retainer 872c is partially disposed in the groove 846, such that the seal retainer 872c is disposed immediately adjacent (e.g., in contact with) the stepped portion 844d of the valve seat 832, the bottom surface 876 of the valve cage 836, an underside of the seal 872a, and an underside of the biasing element 872b. As such, the seal retainer 872c is configured to compress the biasing element 872b to the desired height and diameter.

As shown in FIG. 7, when the valve seat 832 and the valve cage 836 are disposed in the valve body 104, the outwardly-facing surface 844 of the valve seat 832 is positioned immediately adjacent the inwardly-facing surface 870 of the valve cage 836, the seal 872a is disposed immediately adjacent the inwardly-facing surface 290 of the valve body 104, and the seal retainer 872c is disposed immediately adjacent the inwardly-facing surface 290 of the valve body 104. So arranged, a horizontal or radial gap 894 and a vertical or axial gap 898 are formed in the control valve 800. The gaps 894, 898 are substantially identical to the gaps 494, 498, respectively, described above in FIG. 5.

Like the valve seat 232 and the valve cage 436, the valve seat 832 and the valve cage 836 are screwed or bolted together via a plurality of screws or fasteners 906 (e.g., a plurality of socket head cap screws). This, in turn, retains the compression of the biasing element 872b by the seal retainer 872c, such that the biasing element 872b generates a radial force that is sufficient to affect a tight seal between the valve body 104 and the valve seat 832. When the valve seat 832 and the valve cage 836 are screwed or bolted together, the seal 872a is pushed or biased radially outward and against the inwardly-facing surface 290 of the valve body 104, such that a horizontal or radial gap 910 is formed between an inwardly-facing surface of the seal 472a and the third surface 874e of the valve cage 836. The gap 910 is substantially equal to the gap 894 described above. This arrangement is also described herein as being the first compression state.

Arranged in this way, the control valve 800 operates in a manner similar to the control valves 200, 400, 600 described above. As such, the sealing assembly 872 is arranged to exploit differential thermal expansion between the valve body 104 and the components of the valve trim assembly 812 in both the axial direction and the radial direction to provide an improved and tight seal between the valve body 104 and the valve trim assembly 812 at different (e.g., higher) temperatures.

Figure 8:
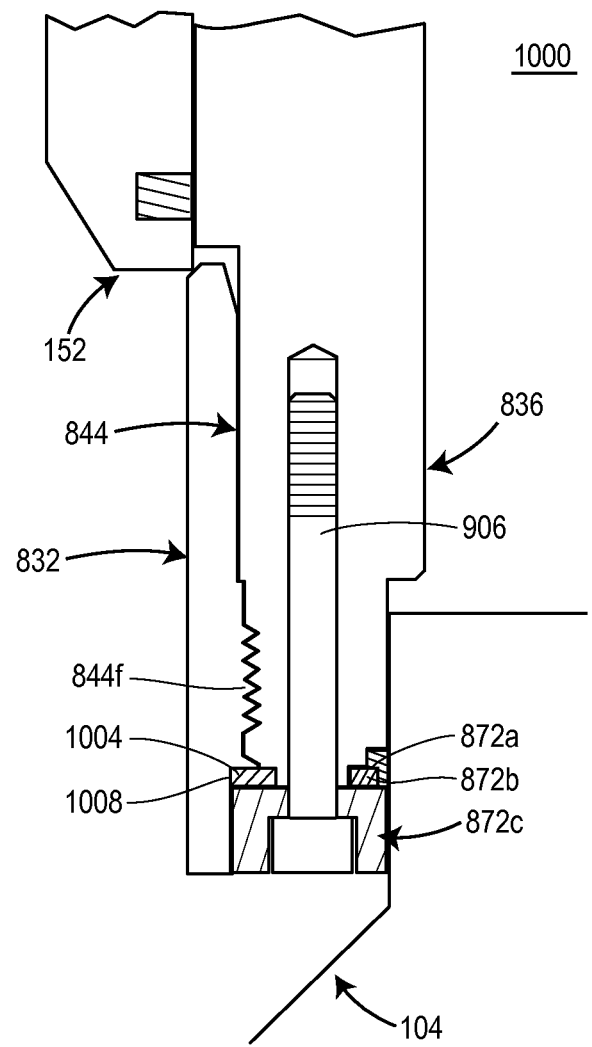
FIG. 8 is an enlarged, partial cross-sectional view of a right-side portion of the control valve of FIG. 1 with a sealing assembly constructed and assembled in accordance with the teachings of a sixth disclosed example of the present invention.

FIG. 8 illustrates a cross-sectional view of a right-side portion of another example control valve 1000 constructed and assembled in accordance with the teachings of the present invention. The control valve 1000 is essentially identical to the control valve 800 and has the same components referenced by common reference numbers. The control valve 1000 includes a second biasing element 1004. The second biasing element 1004 is, like the biasing element 872b, a spiral wound gasket made of graphite and metal windings. The biasing element 1004 is disposed in a notch 1008 in the outwardly-facing surface 844 of the valve seat 832 and is disposed between the valve seat 832, the valve cage 836, and the seal retainer 872c. So arranged, the biasing element 1004 is configured to prevent leakage that may otherwise flow under a head of the screw 906, past the threaded portion 844f of the seat ring 832, and out past a radially outward diameter of the valve plug 152.

In other examples, the size, shape, orientation, and/or arrangement of any of the valve bodies, valve seats, valve cages, and/or components therein, described herein can vary and yet still fall within the spirit and scope of the present invention.

Based on the foregoing description, it should be appreciated that the control valves described herein include a high-temperature sealing assembly that can simultaneously affect a tight seal between a body of a large control valve and a quick change valve trim assembly and exploit or utilize differential thermal expansion between components of large control valves in a radial direction and/or an axial direction to provide an even better seal between the body of the large control valve and the quick change valve trim assembly. The control valve components can thus be made of different materials (i.e., components can be selected independently of the material from which the components are made), leakage between control valve components can be minimized, leakage in or around the components of the sealing assembly can be minimized (which, in turn, may also prevent damage to the components), and the control valves can be operated at a full temperature range of between approximately −325 degrees Fahrenheit and approximately 1100 degrees Fahrenheit

The invention claimed is:
1. A fluid flow control device comprising:
a valve body defining an inlet, an outlet, a fluid flow path extending between the inlet and the outlet, and a longitudinal axis, the valve body having a first thermal expansion coefficient;
a valve seat disposed within the valve body and defining an orifice through which the fluid flow path passes;
a valve cage coupled to the valve seat within the valve body and defining an interior bore, the cage having a second thermal expansion coefficient different than the first thermal expansion coefficient;

a valve plug sized for insertion into the interior bore of the valve cage and movable along an axis between a closed position, in which the valve plug engages the valve seat, and an open position;

a gland defined by at least one of the valve seat and the valve cage; and a sealing assembly arranged within the gland to provide a seal between the valve body and the valve cage, the sealing assembly comprising a seal portion and a biasing element disposed immediately adjacent the seal portion, and the sealing assembly arranged in a first compression state in which the sealing assembly provides first radial and axial compression forces, the sealing assembly movable to a second compression state in which the sealing assembly provides second radial and axial compression forces greater than the first radial and axial compression forces, the movement of the sealing assembly being due to differential thermal expansion between the valve body and the valve cage in an axial direction that is parallel to the longitudinal axis and in a radial direction that is transverse to the longitudinal axis, wherein the biasing element comprises a gasket and the seal portion has a thermal expansion coefficient equal to the first or second thermal expansion coefficient, and wherein the gasket is disposed in contact with the seal portion, the gasket configured to provide the first and second radial compression forces to the seal portion to bias the seal portion outward against the valve body to provide the seal between the valve body and the valve cage.

2. The fluid flow control device of claim 1, wherein the valve seat and the valve cage are bolted together via a plurality of screws.

3. The fluid flow control device of claim 1, wherein the valve seat and the valve cage are threaded together.

4. The fluid flow control device of claim 1, wherein the sealing assembly is arranged within the gland such that a radial gap is formed between the valve cage and the seal portion of the sealing assembly, the radial gap being substantially closed when the sealing assembly moves to the second compression state.

5. The fluid flow control device of claim 1 wherein the seal portion is made of the same material as the valve body.

6. The fluid flow control device of claim 1 wherein the gasket is disposed radially inward of the seal portion within the gland.

7. The fluid flow control device of claim 1, wherein the gasket comprises a first gasket and the sealing assembly further comprises a second gasket, the first gasket being disposed immediately adjacent the seal portion, and the second gasket being disposed between the valve seat and the valve cage.

8. The fluid flow control device of claim 1, wherein the sealing assembly further comprises a seal retainer.

9. The fluid flow control device of claim 8, wherein the seal retainer is positioned between the valve seat and the valve body and immediately adjacent the seal portion and the gasket.

10. The fluid flow control device of claim 1, wherein the fluid flow control device is configured for operation at a service temperature of between approximately 450 degrees Fahrenheit and approximately 1100 degrees Fahrenheit.

11. The fluid flow control device of claim 1, wherein the seal portion comprises a first seal portion, the sealing assembly further comprising a second seal portion, a third seal portion, and a fourth seal portion, and wherein the biasing element comprises a first wound gasket, the sealing assembly further comprising a second wound gasket, the first and second seal portions being disposed adjacent the valve body and having a thermal expansion coefficient equal to the first thermal expansion coefficient, the third and fourth seal portions being disposed adjacent the valve cage and having a thermal expansion coefficient equal to the second thermal expansion coefficient, and the first wound gasket being disposed between the first and third seal portions and the second wound gasket disposed between the second and fourth seal portions such that the first wound gasket is configured to provide the first and second radial compression forces to the first and third seal portions to bias the first seal portion toward the valve cage and bias the third seal portion toward the valve body, and the second wound gasket is configured to provide the first and second radial compression forces to the second and fourth seal portions to bias the second seal portion toward the valve cage and bias the fourth seal portion toward the valve body.

12. A fluid flow control device comprising:

a valve body defining an inlet, an outlet, a fluid flow path extending between the inlet and the outlet, and a longitudinal axis, the valve body having a first thermal expansion coefficient;

a valve seat disposed within the valve body and defining an orifice through which the fluid flow path passes;

a valve cage coupled to the valve seat within the valve body and defining an interior bore, the cage having a second thermal expansion coefficient different than the first thermal expansion coefficient;

a valve plug sized for insertion into the interior bore of the valve cage and movable along an axis between a closed position, in which the valve plug engages the valve seat, and an open position;

a gland defined by at least one of the valve seat and the valve cage; and a sealing assembly arranged within the gland to provide a seal between the valve body and the valve cage, the sealing assembly comprising at least one seal portion and at least one biasing element disposed immediately adjacent the at least one seal portion, and the sealing assembly arranged in a first compression state in which the sealing assembly provides first radial and axial compression forces, the sealing assembly movable to a second compression state in which the sealing assembly provides second radial and axial compression forces greater than the first radial and axial compression forces, the movement of the sealing assembly being due to differential thermal expansion between the valve body and the valve cage in an axial direction that is parallel to the longitudinal axis and in a radial direction that is transverse to the longitudinal axis, wherein the least one seal portion comprises a first seal portion, a second seal portion, a third seal portion, and a fourth seal portion, and wherein the at least one biasing element comprises first and second wound gaskets, the first and second seal portions being disposed adjacent the valve body and having a thermal expansion coefficient equal to the first thermal expansion coefficient, the third and fourth seal portions being disposed adjacent the valve cage and having a thermal expansion coefficient equal to the second thermal expansion coefficient, and the first wound gasket being disposed between the first and third seal portions and the second wound gasket disposed between the second and fourth seal portions such that the first wound gasket is configured to provide the first and second radial compression forces to the first and third seal portions to bias the first seal portion toward the valve cage and bias the third seal portion toward the valve body, and the second wound gasket is configured to provide the first and second radial compression forces to the second and fourth seal portions to bias the second seal portion toward the valve cage and bias the fourth seal portion toward the valve body.

13. The fluid flow control device of claim 12, wherein the first and second seal portions are made of the same material as the valve cage, and wherein the third and fourth seal portions are made of the same material as the valve body.

14. The fluid flow control device of claim 12, wherein the sealing assembly further comprises a packing ring disposed between the first and second wound gaskets.

15. A fluid flow control device comprising:
  a valve body defining an inlet, an outlet, a fluid flow path extending between the inlet and the outlet, and a longitudinal axis, the valve body having a first thermal expansion coefficient;
  a valve seat disposed within the valve body and defining an orifice through which the fluid flow path passes;
  a valve cage coupled to the valve seat within the valve body and defining an interior bore, the cage having a second thermal expansion coefficient different than the first thermal expansion coefficient;
  a valve plug sized for insertion into the interior bore of the valve cage and movable along an axis between a closed position, in which the valve plug engages the valve seat, and an open position;
  a sealing assembly disposed within the fluid flow control device to affect a seal between the valve cage and the valve body, the sealing assembly having a biasing element and a sealing portion disposed adjacent to the biasing element, the sealing assembly being arranged in a first compression state in which the biasing element applies a first radial compression force to the sealing portion to bias the sealing portion toward the valve body, the sealing assembly movable to a second compression state in which the biasing element applies a second radial compression force, greater than the first radial compression force, to the sealing portion to bias the sealing portion toward the valve body, the movement of the sealing assembly being due to differential thermal expansion between the valve body and the valve cage in a direction parallel to the longitudinal axis and in a direction transverse to the longitudinal axis,
  wherein the biasing element comprises a spiral wound gasket and the sealing portion has a thermal expansion coefficient equal to the first thermal expansion coefficient.

16. The fluid flow control device of claim 15, wherein the biasing element is disposed radially inward of the sealing portion.

17. The fluid flow control device of claim 15, wherein the sealing assembly further comprises a sealing retainer configured to compress the biasing element.

18. The fluid flow control device of claim 17, wherein the sealing retainer is disposed between the valve seat and the valve body and immediately adjacent the biasing element.

19. The fluid flow control device of claim 15, wherein the sealing portion comprises a first sealing portion,
  wherein the sealing assembly has a second sealing portion, a third sealing portion, and a fourth sealing portion, the first and second sealing portions being disposed adjacent the valve body and the second sealing portion having a thermal expansion coefficient equal to the first thermal expansion coefficient, the third and fourth sealing portions being disposed adjacent the valve cage and having a thermal expansion coefficient equal to the second thermal expansion coefficient, and
  wherein the spiral wound gasket comprises a first spiral wound gasket and the sealing assembly further comprises a second spiral wound gasket, the first spiral wound gasket being disposed between the first and third sealing portions and the second spiral wound gasket being disposed between the second and fourth sealing portions such that the first spiral wound gasket is configured to apply the first radial compression force to the first and third seal portions to bias the first seal portion toward the valve body and to bias the third seal portion toward the valve cage, and the second spiral wound gasket is configured to apply the second radial compression forces to the second and fourth seal portions to bias the second seal portion toward the valve body and to bias the fourth sealing portion toward the valve cage.

20. A sealing assembly for a fluid control device having a valve body, a valve seat, and a valve cage, the valve body being made of a first material having a first thermal expansion coefficient, and the valve cage or the valve seat being made of a second material having a second thermal expansion coefficient different from the first thermal expansion coefficient, the sealing assembly comprising:
  a biasing element; and
  at least one sealing portion disposed adjacent to the biasing element, the at least one sealing portion being made from the same material as the valve body,
  wherein the sealing assembly is arranged in a first compression state in which the biasing element applies a first radial compression force to the at least one sealing portion to bias the at least one sealing portion toward the valve body to affect a seal between the valve cage and the valve body, wherein the sealing assembly is movable to a second compression state in which the biasing element applies a second radial compression force, greater than the first radial compression force, to the at least one sealing portion to bias the at least one sealing portion toward the valve body to affect the seal between the valve cage and the valve body, and wherein movement of the sealing assembly is due to differential thermal expansion between the valve body and the valve cage or the valve seat in a direction parallel to the longitudinal axis and in a direction transverse to the longitudinal axis.

21. The sealing assembly of claim 20, wherein the biasing element is configured to bias the at least one sealing portion into contact with the valve body to affect the seal.

22. The sealing assembly of claim 20, wherein the biasing element comprises a spiral wound gasket.

23. The sealing assembly of claim 20, wherein the biasing element is disposed radially inward of the sealing portion.

24. The sealing assembly of claim 20, further comprising a sealing retainer configured to compress the biasing element.

25. The sealing assembly of claim 24, wherein the sealing retainer is disposed between the valve seat and the valve body and immediately adjacent the biasing element.

26. The sealing assembly of claim 20, wherein the at least one sealing portion comprises a first sealing portion, the sealing assembly further comprising a second sealing portion, a third sealing portion, and a fourth sealing portion, the first and second sealing portions being disposed adjacent the valve body and the second sealing portion having a thermal expansion coefficient equal to the first thermal expansion coefficient, the third and fourth sealing portions being disposed adjacent the valve cage and having a thermal expansion coefficient equal to the second thermal expansion coefficient, and wherein the biasing element comprises a first spiral wound gasket and the sealing assembly further comprises a second spiral wound gasket, the first spiral wound gasket being disposed between the first and third sealing portions and the second spiral wound gasket being disposed between the second and fourth sealing portions such that the first spiral wound gasket is configured to apply the first and second radial compression forces to the first and third sealing portions to bias the first sealing portion toward the valve body and to bias the third sealing against the valve cage and the second spiral wound gasket is configured to apply the first and second radial compression forces to the second and fourth sealing portions to bias the second sealing portion toward the valve body and to bias the fourth sealing portion against the valve cage.

27. The sealing assembly of claim 20 wherein the sealing assembly is configured for operation at a temperature of between approximately 450 degrees Fahrenheit and approximately 1100 degrees Fahrenheit.

* * * * *